United States Patent
Fu et al.

(10) Patent No.: US 9,165,346 B2
(45) Date of Patent: Oct. 20, 2015

(54) METHOD AND APPARATUS FOR REDUCING IMAGE NOISE

(71) Applicant: Fujitsu Limited, Kawasaki-shi, Kanagawa (JP)

(72) Inventors: Xuan Fu, Beijing (CN); Jiangli Ye, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/262,062

(22) Filed: Apr. 25, 2014

(65) Prior Publication Data

US 2014/0321744 A1    Oct. 30, 2014

(30) Foreign Application Priority Data

Apr. 26, 2013    (CN) .......................... 2013 1 0150233

(51) Int. Cl.
  *G06K 9/00*    (2006.01)
  *G06T 5/40*    (2006.01)
  *G06T 5/20*    (2006.01)
  *G06T 5/00*    (2006.01)

(52) U.S. Cl.
  CPC . *G06T 5/002* (2013.01); *G06T 5/20* (2013.01); *G06T 5/40* (2013.01)

(58) Field of Classification Search
  None
  See application file for complete search history.

(56) References Cited

U.S. PATENT DOCUMENTS

2008/0063295 A1*  3/2008  Hasegawa .................. 382/261
2013/0064448 A1*  3/2013  Tomaselli et al. ........... 382/167

OTHER PUBLICATIONS

United Kingdom Search Report mailed Oct. 7, 2014, in corresponding United Kingdom Patent Application No. GB1405923.2.

\* cited by examiner

*Primary Examiner* — Siamak Harandi
(74) *Attorney, Agent, or Firm* — Staas & Halsey LLP

(57) ABSTRACT

Embodiments of the present invention provide a method and an apparatus for reducing image noise. The method includes decomposing an original image into a luminance channel image and at least one chrominance channel image, and calculating a weighted average value of each pixel of the luminance channel image and the chrominance channel image by using luminance information, to correct each pixel of the luminance channel image and the chrominance channel image. By virtue of the embodiments of the present invention, it is possible to effectively avoid color dispersion at edges of images, to achieve easy implementation, and to effect low cost.

16 Claims, 5 Drawing Sheets

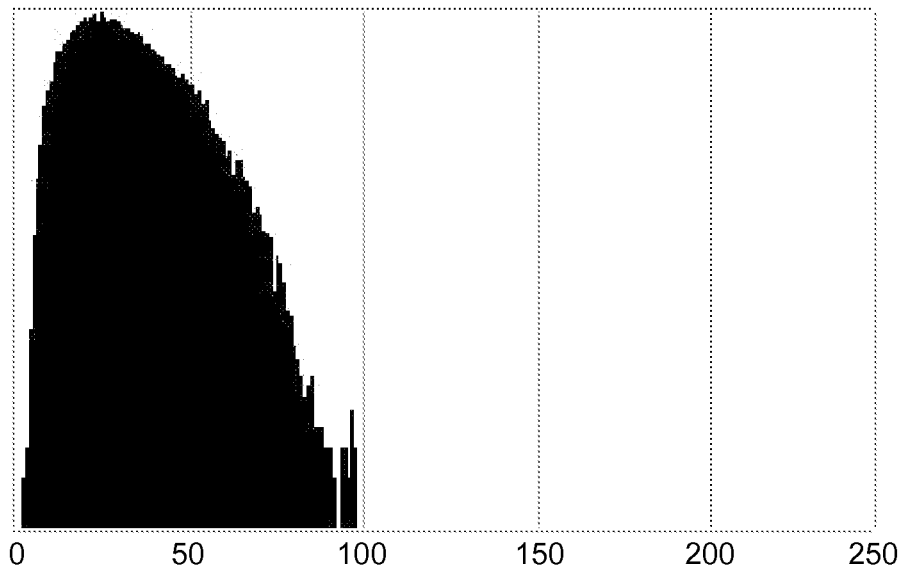
Fig.2B
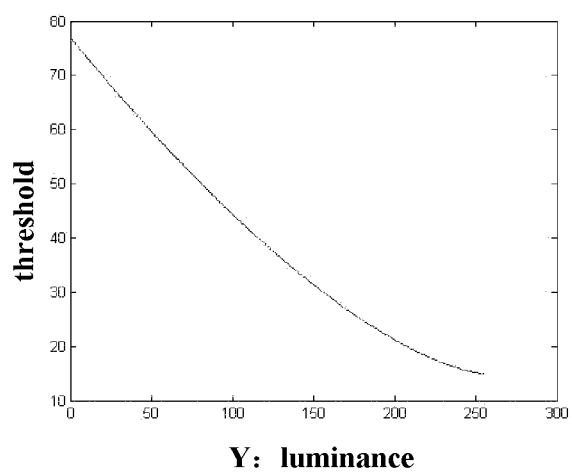
Fig.3

METHOD AND APPARATUS FOR REDUCING IMAGE NOISE

CROSS-REFERENCE TO RELATED APPLICATIONS

This application claims the benefit of Chinese Application No. 201310150233.5, filed Apr. 26, 2013, the disclosure of which is incorporated herein by reference.

BACKGROUND

1. Field

The present invention relates to image processing technology, and more particularly to a method and an apparatus for reducing image noise.

2. Description of the Related Art

In digital cameras, ISO is a parameter that indicates image sensor gain. An image captured when ISO is set relatively low has less noise and vivid colors, but the captured image tends to blur due to slow shutter speed. An image captured when ISO is set relatively high and brightness is relatively low has higher image sensor gain, and is seldom affected by blurring, but is more easily subject to the influence of noise as compared with the case in which ISO is set relatively low.

As should be noted, the foregoing introduction to the background of the art is merely meant to facilitate a clear and complete explanation to the technical solutions of the present invention, and is enunciated in an effort to make easier the comprehension by persons skilled in the art. It should not be construed so, that these technical solutions were publicly known to persons skilled in the art simply because they have been enunciated in the Background of the Related Art of the present invention.

SUMMARY

Additional aspects and/or advantages will be set forth in part in the description which follows and, in part, will be apparent from the description, or may be learned by practice of the invention.

Embodiments of the present invention aim to provide a method and an apparatus for reducing image noise, whereby it is possible to effectively reduce image noise, to be simply implemented, and to save the cost of hardware.

According to the first aspect of the embodiments of the present invention, there is provided a method for reducing image noise, which method includes:

decomposing an original image into a luminance channel image and at least one chrominance channel image;

calculating a weighted average value of each pixel of the luminance channel image and the chrominance channel image by using luminance information, to correct each pixel of the luminance channel image and the chrominance channel image; wherein, the following expression is used when calculating the weighted average value of each pixel of each chrominance channel image by using luminance information:

$$C_{wm\_1}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y) \times C_1(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y)};$$

the following expression is used when calculating the weighted average value of each pixel of the luminance channel image by using luminance information:

$$Y_{wm}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times Y(x, y)}{\sum_{y=y_c-y_{N1}}^{y_c+y_{N2}} \sum_{x=x_c-x_{N1}}^{x_c+x_{N2}} W_d(x, y) \times W_Y(x, y)};$$

where $(x_c, y_c)$ represents a coordinate of a current pixel to be processed; $(x, y)$ represents a coordinate of a pixel to be measured in a predetermined region peripheral to the current pixel; wherein $x_c - x_{N1} \leq x \leq x_c + x_{N2}$; $y_c - y_{N1} \leq y \leq y_c + y_{N2}$; $x_{N1}$, $x_{N2}$, $y_{N1}$, $y_{N2}$ are greater than zero; $C_{wm\_1}(x_c, y_c)$ represents a weighted average value of current pixel chrominance, $W_d(x, y)$ represents a distance weight of the pixel to be measured, $W_Y(x, y)$ represents a luminance weight of the pixel to be measured, $C_1(x, y)$ represents a chrominance value of the pixel to be measured, $W_{C1}(x, y)$ represents a chrominance weight of the pixel to be measured, and $Y(x, y)$ represents a luminance value of the pixel to be measured.

According to the second aspect of the embodiments of the present invention, there is provided a method for reducing image noise, which method includes calculating a weighted average value of each pixel of at least one color channel image decomposed from an original image by using luminance information, to correct each pixel of the color channel image; wherein, the following expression is used when calculating the weighted average value of each pixel of each color channel image by using luminance information:

$$C_{wm\_2}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y) \times C_2(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y)};$$

where $(x_c, y_c)$ represents a coordinate of a current pixel to be processed; $(x, y)$ represents a coordinate of a pixel to be measured in a predetermined region peripheral to the current pixel; wherein $x_c - x_{N1} \leq x \leq x_c + x_{N2}$; $y_c - y_{N1} \leq y \leq y_c + y_{N2}$; $x_{N1}$, $x_{N2}$, $y_{N1}$, $y_{N2}$ are greater than zero; $C_{wm\_2}(x_c, y_c)$ represents a weighted average value of current pixel color, $W_d(x, y)$ represents a distance weight of the pixel to be measured, $W_Y(x, y)$ represents a luminance weight of the pixel to be measured, $C_2(x, y)$ represents a color value of the pixel to be measured, $W_{C2}(x, y)$ represents a color weight of the pixel to be measured, and $Y(x, y)$ represents a luminance value of the pixel to be measured.

According to the third aspect of the embodiments of the present invention, there is provided an apparatus for reducing image noise, which apparatus includes an image decomposing unit configured to decompose an original image into a luminance channel image and at least one chrominance channel image; and a first image processing unit configured to calculate a weighted average value of each pixel of the luminance channel image and the chrominance channel image by using luminance information, to correct each pixel of the luminance channel image and the chrominance channel image; wherein, the following expression is used when calculating the weighted average value of each pixel of each chrominance channel image by using luminance information:

$$C_{wm\_1}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y) \times C_1(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y)};$$

the following expression is used when calculating the weighted average value of each pixel of the luminance channel image by using luminance information:

$$Y_{wm}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times Y(x, y)}{\sum_{y=y_c-y_{N1}}^{y_c+y_{N2}} \sum_{x=x_c-x_{N1}}^{x_c+x_{N2}} W_d(x, y) \times W_Y(x, y)};$$

where $(x_c, y_c)$ represents a coordinate of a current pixel to be processed; $(x, y)$ represents a coordinate of a pixel to be measured in a predetermined region peripheral to the current pixel; wherein $x_c - x_{N1} \le x \le x_c + x_{N2}$; $y_c - y_{N1} \le y \le y_c + y_{N2}$; $x_{N1}$, $x_{N2}$, $y_{N1}$, $y_{N2}$ are greater than zero; $C_{wm\_1}(x_c, y_c)$ represents a weighted average value of current pixel chrominance, $W_d(x, y)$ represents a distance weight of the pixel to be measured, $W_Y(x, y)$ represents a luminance weight of the pixel to be measured, $C_1(x, y)$ represents a chrominance value of the pixel to be measured, $W_{C1}(x, y)$ represents a chrominance weight of the pixel to be measured, and $Y(x, y)$ represents a luminance value of the pixel to be measured.

According to the fourth aspect of the embodiments of the present invention, there is provided an apparatus for reducing image noise, which apparatus includes a second image processing unit configured to calculate a weighted average value of each pixel of at least one color channel image decomposed from an original image by using luminance information, to correct each pixel of the color channel image; wherein, the following expression is used when calculating the weighted average value of each pixel of each color channel image by using luminance information:

$$C_{wm\_2}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y) \times C_2(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y)};$$

where $(x_c, y_c)$ represents a coordinate of a current pixel to be processed; $(x, y)$ represents a coordinate of a pixel to be measured in a predetermined region peripheral to the current pixel; wherein $x_c - x_{N1} \le x \le x_c + x_{N2}$; $y_c - y_{N1} \le y \le y_c + y_{N2}$; $x_{N1}$, $x_{N2}$, $y_{N1}$, $y_{N2}$ are greater than zero; $C_{wm\_2}(x_c, y_c)$ represents a weighted average value of current pixel color, $W_d(x, y)$ represents a distance weight of the pixel to be measured, $W_Y(x, y)$ represents a luminance weight of the pixel to be measured, $C_2(x, y)$ represents a color value of the pixel to be measured, $W_{C2}(x, y)$ represents a color weight of the pixel to be measured, and $Y(x, y)$ represents a luminance value of the pixel to be measured.

Effects of the embodiments according to the present invention are as follows: by using luminance information to process chrominance or color channel images, it is possible to effectively reduce image noise, to be simply implemented, and to save the cost of hardware.

BRIEF DESCRIPTION OF THE DRAWINGS

These and/or other aspects and advantages will become apparent and more readily appreciated from the following description of the embodiments, taken in conjunction with the accompanying drawings of which:

Accompanying drawings herein included are provided for further comprehension of the embodiments of the present invention, constitute a part of the Description to exemplarily illustrate the embodiments of the present invention, and enunciate the principles of the present invention together with the literal description. Apparently, the accompanying drawings described below are merely directed to some embodiments of the present invention, and persons ordinarily skilled in the art may deduce other accompanying drawings from these accompanying drawings without creative effort being spent in the process. In the drawings:

FIGS. 2A and 2B are diagrams illustrating comparison of noise levels to which luminances according to Embodiment 2 of the present invention correspond;

FIG. 3 is a diagram illustrating a relation curve between luminance and threshold $th_{e\_Y}$ in Embodiment 2 of the present invention;

DETAILED DESCRIPTION

Various embodiments of the present invention are described below with reference to the accompanying drawings. These embodiments are merely exemplary in nature, and are not restrictions to the present invention. In order that persons skilled in the art could easily comprehend the principles and embodiments of the present invention, embodiments of the present invention are described with the example of performing image noise reduction processing based on the bilateral filtering mode. As should be noted, however, the embodiments of the present invention are applicable to all circumstances in which reduction of image noise is involved.

Embodiment 1

Figure 1:
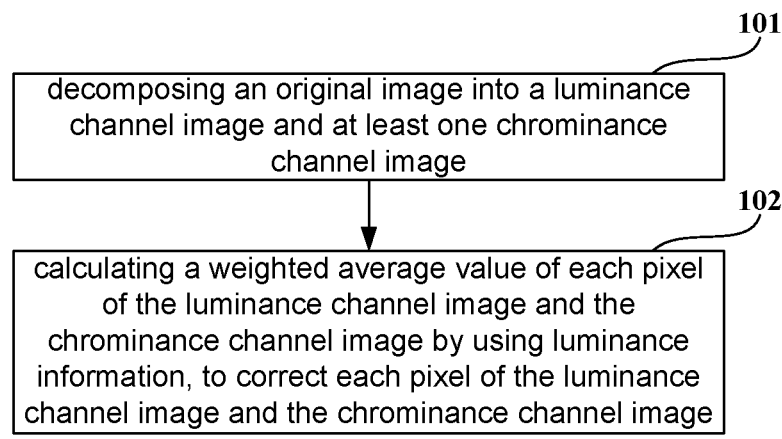
FIG. 1 is a flowchart illustrating a method for reducing image noise according to Embodiment 1 of the present invention.

FIG. 1 is a flowchart illustrating a method for reducing image noise according to Embodiment 1 of the present invention which may be performed by a processor. As shown in FIG. 1, the method includes the following steps.

Step 101—decomposing an original image into a luminance channel image and at least one chrominance channel image.

Any currently available technique may be employed in this embodiment to decompose color space, and this will not be redundantly described in the context.

Wherein, the number of chrominance channels may be equal to or greater than 2, and this can be determined according to practical circumstances—for instance, three channels are divided according to color space, e.g. (Y, Cb, Cr), Cb and Cr correspond to chrominance channels, Y corresponds to a luminance channel; alternatively, (Y, U, V), U and V correspond to chrominance channels, and Y corresponds to a luminance channel.

Step 102—calculating a weighted average value of each pixel of the luminance channel image and the chrominance channel image by using luminance information, to correct each pixel of the luminance channel image and the chrominance channel image.

Wherein, the following expression is used when calculating the weighted average value of each pixel of the luminance channel image by using luminance information:

$$Y_{wm}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times Y(x, y)}{\sum_{y=y_c-y_{N1}}^{y_c+y_{N2}} \sum_{x=x_c-x_{N1}}^{x_c+x_{N2}} W_d(x, y) \times W_Y(x, y)}; \quad (1)$$

The following expression is used when calculating the weighted average value of each pixel of each chrominance channel image by using luminance information:

$$C_{wm\_1}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y) \times C_1(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y)}; \quad (2)$$

In expressions (1) and (2), $(x_c, y_c)$ represents a coordinate of a pixel to be currently processed/filtered (current pixel); $(x, y)$ represents a coordinate of a pixel to be measured in a predetermined region peripheral to the current pixel; wherein $x_c-x_{N1} \leq x \leq x_c+x_{N2}$; $y_c-y_{N1} \leq y \leq y_c+y_{N2}$; $x_{N1}, x_{N2}, y_{N1}, y_{N2}$ are greater than zero; $C_{wm\_1}(x_c, y_c)$ represents a weighted average value of current pixel chrominance, $W_d(x, y)$ represents a distance weight of the pixel to be measured, $W_Y(x, y)$ represents a luminance weight of the pixel to be measured, $C_1(x, y)$ represents a chrominance value of the pixel to be measured, $W_{C1}(x, y)$ represents a chrominance weight of the pixel to be measured, and $Y(x, y)$ represents a luminance value of the pixel to be measured.

For instance, when chrominance channel images are Cb and Cr, the aforementioned expression (2) may be expressed, respectively, as:

$$C_{wm\_Cb}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{Cb}(x, y) \times C_{Cb}(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{Cb}(x, y)} \quad (2\text{-}1)$$

$$C_{wm\_Cr}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{Cr}(x, y) \times C_{Cr}(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{Cr}(x, y)} \quad (2\text{-}2)$$

By the same token, for the circumstance in which chrominance channel images are U, V, it is also possible to obtain the weighted average value of each pixel chrominance by employing expression (2), and this will not be repetitively described in the context.

In this embodiment, the distance weight $W_d(x, y)$, the luminance weight $W_Y(x, y)$ and the chrominance weight $W_{C1}(x, y)$ in expressions (1) and (2) can all be obtained by a currently available bilateral filtering method—for instance, these weight values can be obtained by employing the following expressions:

$$W_Y(x, y) = e^{-\frac{D_Y^2}{(sigma\_e1)^2}} \quad (3\text{-}1)$$

$$W_d(x, y) = e^{-\frac{(x_c-x)^2+(y_c-y)^2}{sigma\_d^2}} \quad (4\text{-}1)$$

$$W_C(x, y) = e^{-\frac{D_C^2}{(sigma\_e2)^2}} \quad (5\text{-}1)$$

For instance, for channels Cb and Cr, $D_C$ may be $D_{Cb}$ and $D_{Cr}$, respectively; for channels U, V, $D_C$ may be $D_U$ and $D_V$, respectively.

In the foregoing expressions (3-1), (4-1) and (5-1), Dy represents an absolute value of a luminance difference between the pixel to be measured and the current pixel; Dc represents an absolute value of a chrominance difference between the pixel to be measured and the current pixel; sigma_e1 represents filtering strength of a luminance interval, the value range of sigma_e1 is [0,∞); sigma_e2 represents filtering strength of a chrominance interval, the value range of sigma_e2 is [0,∞); and sigma_d represents filtering strength within a distance space, sigma_d [0,∞). Of these, sigma_e1 and sigma_e2 may be evaluated identically or differently.

As can be known from the above embodiment, it is possible to effectively reduce image noise by using luminance information to filter chrominance channel images.

Embodiment 2

Embodiment 2 of the present invention further provides a method for reducing image noise which may be performed by a processor. This method is based on Embodiment 1 and differs therefrom in obtaining a luminance weight value by employing a mode according to this embodiment.

The luminance weight is obtained by using the following expression:

$$W_Y(x, y) = \begin{cases} \left(1 - \dfrac{D_Y}{th_{e\_Y}}\right)^a & D_Y < th_{e\_Y} \\ 0 & D_Y \geq th_{e\_Y} \end{cases} \quad (3\text{-}2)$$

where $th_{e\_Y}$ represents a first threshold, and a represents a parameter relevant to noise characteristics in a flat region containing the current pixel.

In this embodiment, the flat region containing the current pixel is a non-boundary region of an object, and the surrounding pixels are relevant to the current pixel, while pixels on the boundary are far less relevant to objects at two sides surrounding the boundary.

In this embodiment, the a may either be empirically preset or determined according to practical circumstances—for instance, the a may be evaluated as 2, 1.5, 1.2 or 1, etc., and this will not be redundantly described in the context.

Alternatively, the value of a may be auto-adaptively obtained according to steepness degree of a noise curve of noise in the flat region containing the current pixel, and the value of a is greater when the noise curve is steep than the value of a when the noise curve is gentle.

Figure 2A:
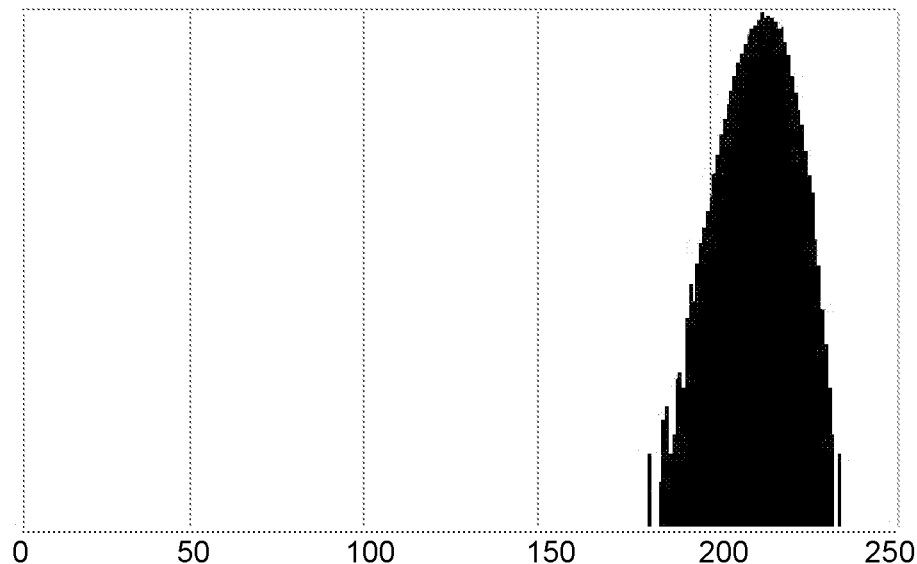

FIGS. 2A and 2B are diagrams illustrating comparison of noise levels to which luminances according to Embodiment 2 of the present invention correspond. FIG. 2A illustrates a noise curve when the image block is a bright block, and FIG. 2B illustrates a noise curve when the image block is a dark block. Noise of the bright block is smaller than noise of the dark block.

As shown in FIGS. 2A and 2B, when a pixel block where the current pixel resides is a bright block, the noise curve is steep; when the pixel block where the current pixel resides is a dark block, the noise curve is gentle. The pixel block where the current pixel resides indicates the peripheral region of the current pixel, i.e., the peripheral region is within the predetermined region.

Thus, it is also possible in this embodiment to obtain the value of a by making direct use of bright and dark degrees of the pixel block—for instance, the average value, the low-pass filtering value or the variance of the pixel block is used to determined the value of a, i.e. to firstly determine whether the region containing the current pixel is a flat region, and to determine the value of a according to the average value, the low-pass filtering value or the variance when the region is a flat region. For instance, with respect to a 9×9 pixel block, when the variance of the 9×9 block is smaller than a preset threshold, it can be determined that the region is a flat region, rather than a boundary, in such a circumstance, a is determined by using the average value of the 9×9 block, namely a=1.5+0.1*round(ave_Y/50); because the valuation range of ave_Y is 0-255, then a may be evaluated as 1.5, 1.6, 1.7, 1.8, 1.9 or 2.0, where ave represents the average value (average) and round represents rounding up.

FIG. 3 is a diagram illustrating the relation curve between luminance and threshold $th_{e\_Y}$ in Embodiment 2 of the present invention, the threshold may be obtained by the relation curve. As shown in FIG. 3, the threshold tends to fall with the increase in luminance.

Embodiment 3

Embodiment 3 of the present invention further provides a method for reducing image noise. This method is based on Embodiment 1 and differs therefrom in obtaining a distance weight value by employing a mode according to this embodiment.

The distance weight is obtained by using the following expression:

$$W_d(x, y) = \dfrac{1}{R^b + 1} \quad (4\text{-}2)$$

where R represents a distance of the pixel to be measured to the current pixel in the predetermined region, and b represents a parameter relevant to noise characteristics.

Similar to a, the value of b may either be preset or predetermined according to practical circumstances.

In addition, the b may also be auto-adaptively obtained according to a range of color noise, wherein a value of b is smaller when the range of the color noise is great than a value of b when the range of the color noise is small. For instance, depending on noise characteristics, when the range of the color noise is very large, noise should be averagely reduced by using information of many remote pixels, and the value of b will be relatively small, such as b=0; when the range of the color noise is not great, the weights of remote pixels can be set smaller to avoid color dispersion, and b can be evaluated relatively great, such as b=0.5 or 1.

In this embodiment, b can be evaluated as 0, 0.4, 0.5 or 1, etc., but is not restricted to these values.

In this embodiment, the noise range indicates the range where noise deviates from the original value of the signal. Since noise is great at a dark region, color shift is greater (the range of color noise is greater, and noise is small at a bright region, color shift is lesser (the range of color noise is smaller). It is therefore possible to determine b by using the average value or the low-pass filtering value of luminance, such as b=0.1*round(ave_Y/50); because the valuation range of ave_Y is 0-255, then b may be evaluated as 0, 0.1, 0.2, 0.3, 0.4 or 0.5.

Figure 4A:
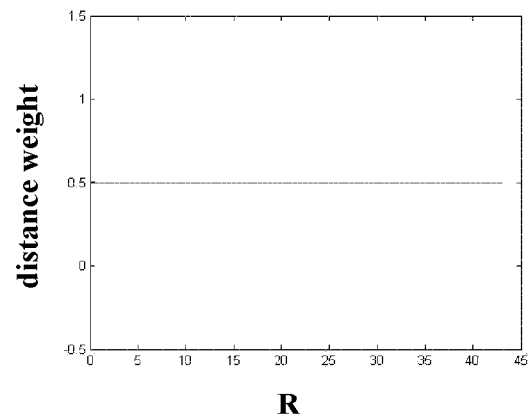
FIGS. 4A and 4B are diagrams illustrating relation curves between a distance weight and the valuation of R in Embodiment 3 of the present invention.
Figure 4B:
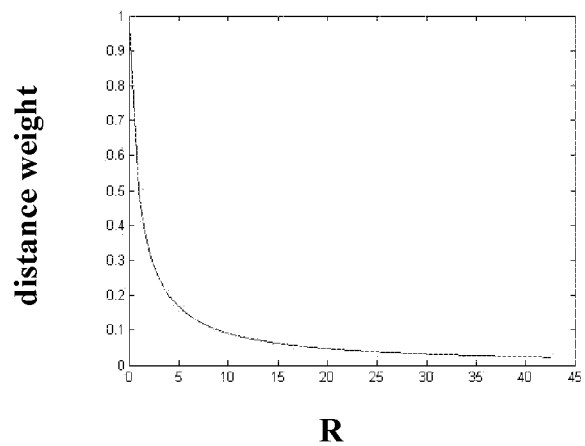

FIGS. 4A and 4B are diagrams illustrating relation curves between a distance weight and the valuation of R in Embodiment 3 of the present invention. As shown in FIG. 4A, when b=0, the distance weight $W_d(x, y)=0.5$; as shown in FIG. 4B, when b=1, $$W_d(x, y) = \dfrac{1}{R + 1}.$$

Embodiment 4

Embodiment 4 of the present invention further provides a method for reducing image noise. This method is based on Embodiment 1 and differs therefrom in obtaining a chrominance weight value by employing a mode according to this embodiment.

The chrominance weight is obtained by using the following expression:

$$W_C(c, y) = \begin{cases} \left(1 - \dfrac{D_C}{th_{e\_C}}\right)^d & D_C < th_{e\_C} \\ 0 & D_C \geq th_{e\_C} \end{cases} \quad (5\text{-}2)$$

where $D_C$ represents an absolute value of a chrominance difference between the pixel to be measured and the current pixel; $th_{e\_C}$ represents a second threshold; and d represents a parameter relevant to noise characteristics.

Generally speaking, the deviation of color noise from the original value is not much great, so we assign a higher weight (d) to a lesser $D_C$, while assign a lesser weight (d) to a higher $D_C$.

In this embodiment, d is valuated as equal to or smaller than 1, for instance, d is valuated as 0, 0.25 or 0.5.

In this embodiment, the valuation of threshold $th_{e\_C}$ is relevant to noise characteristics of the image—when color noise of the image is relatively small, namely the color deviation is not great, then the threshold can be evaluated relatively small, such as 20; however, when color noise is very great, and when color deviation is extremely great, then the threshold should be evaluated relatively great, such as 50. This threshold may either be fixed or auto-adaptive, a greater threshold is selected because noise is relatively great at a dark region, and a smaller threshold can be selected at a bright region.

Figure 5A:
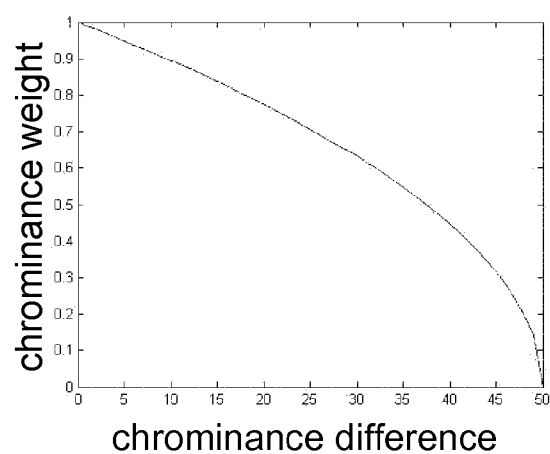
FIGS. 5A and 5B are diagrams illustrating relation curves between a chrominance weight and a chrominance difference according to Embodiment 4 of the present invention.
Figure 5B:
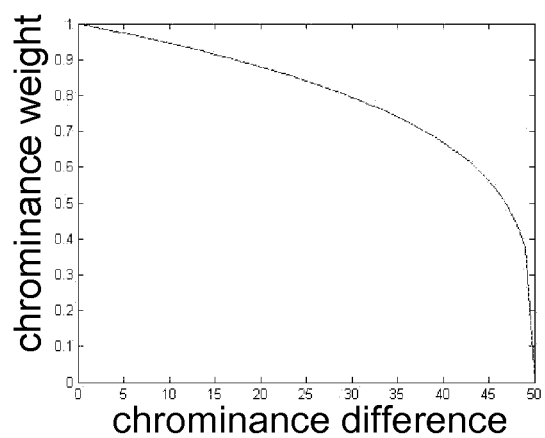

FIGS. 5A and 5B are diagrams illustrating relation curves between a chrominance weight and a chrominance difference according to Embodiment 4 of the present invention. As shown in FIG. 5A, this is a diagram of a relation curve when d is valuated as 0.5. As shown in FIG. 5B, this is a diagram of a relation curve when d is valuated as 0.25.

Embodiment 5

Embodiment 5 of the present invention further provides a method for reducing image noise. This method is based on Embodiment 1. In this embodiment, the distance weight $W_d(x, y)$, the luminance weight $W_Y(x, y)$ and the chrominance weight $W_{C1}(x, y)$ in expressions (1) and (2) can all be obtained by using expressions (3-2), (4-2) and (5-2) in Embodiments 2-4, and can also be obtained by partially employing the modes according to Embodiments 2-4, as well as by partially employing the currently existing mode as described in Embodiment 1, so these are not repetitively described in this context.

Embodiment 6

Figure 6:
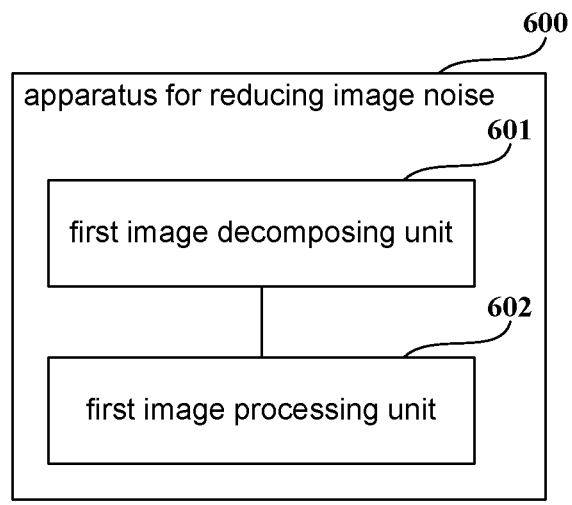
FIG. 6 is a diagram illustrating the configuration of an apparatus for reducing image noise according to Embodiment 6 of the present invention.

FIG. 6 is a diagram illustrating the configuration of an apparatus for reducing image noise according to Embodiment 6 of the present invention. As shown in FIG. 6, the apparatus 600 includes a first image decomposing unit 601, which may be a processor, and a first image processing unit 602, which may be a processor.

The first image decomposing unit 601 is configured to decompose an original image into a luminance channel image and at least one chrominance channel image, and the first image processing unit 602 is configured to calculate a weighted average value of each pixel of the luminance channel image and the chrominance channel image by using luminance information, to correct each pixel of the luminance channel image and the chrominance channel image.

When calculating the weighted average value of each pixel of each chrominance channel image by using luminance information, expression (1) as described in Embodiment 1 is used, its content is herein incorporated, and is not repetitively described in this context.

When calculating the weighted average value of each pixel of the luminance channel image by using luminance information, expression (2) as described in Embodiment 1 is used, whose content is herein incorporated, and is not repetitively described in this context.

In this embodiment, obtainment of the various weights, luminance and chrominance values in expressions (1) and (2) is as described in Embodiments 1-5.

In this embodiment, the apparatus 600 may further include a luminance weight calculating unit (not shown), which may be a processor, configured to obtain a luminance weight by using expression (3-1) or (3-2), whose content is herein incorporated, and is not repetitively described in this context.

When the luminance weight is calculated by using expression (3-2), parameter a in expression (3-2) may either be preset or auto-adaptively obtained, thus, the apparatus 600 may further include a first parameter obtaining unit (not shown), which may be a processor, configured to preset the a, or auto-adaptively obtain the a according to steepness degree of a noise curve, wherein a value of a is greater when the noise curve is steep than a value of a when the noise curve is gentle; when a pixel block where the current pixel resides is a bright block, the noise curve is steep; when the pixel block where the current pixel resides is a dark block, the noise curve is gentle.

In this embodiment, the apparatus 600 may further include a distance weight calculating unit (not shown), which may be a processor, configured to obtain a distance weight by using the aforementioned expression (4-1) or (4-2), whose content is herein incorporated, and is not repetitively described in this context.

In this embodiment, when expression (4-2) is used to calculate the distance weight, the apparatus 600 further includes a second parameter obtaining unit (not shown), which may be a processor, configured to preset b, or auto-adaptively obtain the b according to a range of color noise, wherein a value of b is smaller when the range of the color noise is great than a value of b when the range of the color noise is small. The value of b is as described in Embodiment 3, and no repetition will be made in this context.

In this embodiment, the apparatus 600 may further include a chrominance weight calculating unit (not shown), which may be a processor, configured to obtain a chrominance weight by using the aforementioned expression (5-1) or (5-2), whose content is herein incorporated, and is not repetitively described in this context.

In this embodiment, when the chrominance weight is calculated by using expression (5-2), the apparatus 600 may further include a third parameter obtaining unit, which may be a processor, configured to preset the value of d, for instance, as equal to or smaller than 1, such as 0, 0.25 or 0.5, but the value of b is not restricted to these values.

In the aforementioned embodiment, explanation is made with an example whereby the original image is decomposed into a luminance channel and at least one chrominance channel—for instance, into three channels (Y, Cr, Cb), (Y, U, V), but the luminance information (luminance weight) can be further used to correct images of color channels (such as RGB), explanation of which will be made below with reference to the accompanying drawings.

Embodiment 7

Figure 7:
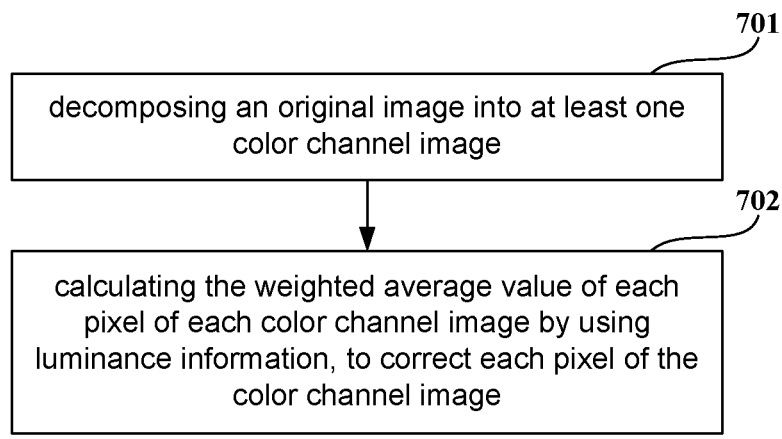
FIG. 7 is a flowchart illustrating a method for reducing image noise according to Embodiment 7 of the present invention.

FIG. 7 is a flowchart illustrating a method for reducing image noise according to Embodiment 7 of the present invention. As shown in FIG. 7, the method includes the following steps.

Step 701—decomposing an original image into at least one color channel image.

In this embodiment, the original image may be decomposed into three color channels (R, G, B) or (C, M, Y).

Step 702—calculating a weighted average value of each pixel of the color channel image by using luminance information, to correct each pixel of the color channel image.

The following expression is used when calculating the weighted average value of each pixel of each color channel image by using luminance information:

$$C_{wm\_2}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y) \times C_2(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y)}; \quad (6)$$

where $(x_C, y_C)$ represents a coordinate of a current pixel to be processed; $(x, y)$ represents a coordinate of a pixel to be measured in a predetermined region peripheral to the current pixel; wherein $x_c-x_{N1} \leq x \leq x_c+x_{N2}$; $y_c-y_{N1} \leq y \leq y_c+y_{N2}$; $x_{N1}$, $x_{N2}$, $y_{N1}$, $y_{N2}$ are greater than zero; $C_{wm\_2}(x, y)$ represents a weighted average value of current pixel color, $W_d(x, y)$ represents a distance weight of the pixel to be measured, $W_Y(x, y)$ represents a luminance weight of the pixel to be measured, $C_2(x, y)$ represents a color value of the pixel to be measured, $W_{C2}(x, y)$ represents a color weight of the pixel to be measured, and $Y(x, y)$ represents a luminance value of the pixel to be measured.

In this embodiment, the original image is decomposed for example into three color channels RGB, or into spaces CMY.

In the aforementioned expression (6), the luminance weight $W_Y(x, y)$ may be obtained by using expression (3-1) or (3-2), whose content is herein incorporated, and is not redundantly described in this context.

In the aforementioned expression (6), the distance weight $W_d(x, y)$ may be obtained by using expression (4-1) or (4-2), whose content is herein incorporated, and is not redundantly described in this context.

In the aforementioned expression (6), the color weight $W_{C2}(x, y)$ may be obtained by using expression (5-1) or (5-2). When the color weight $W_{C2}(x, y)$ is obtained by using expression (5-2), the value of parameter d in expression (5-2) may be equal to or smaller than 1, but may as well be greater than 1.

Embodiment 8

Figure 8:
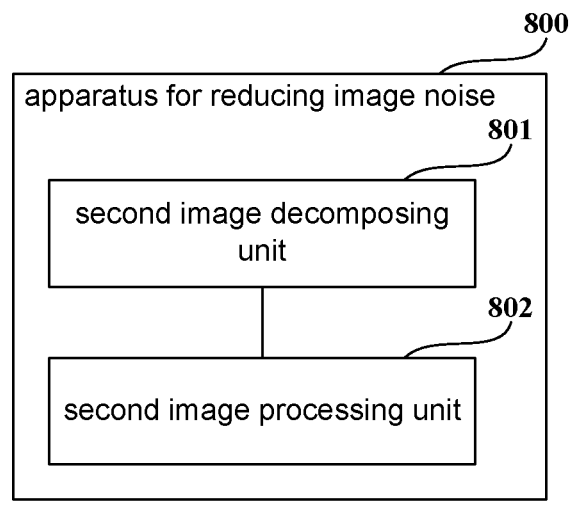
FIG. 8 is a diagram illustrating the configuration of an apparatus for reducing image noise according to Embodiment 8 of the present invention.

FIG. 8 is a diagram illustrating the configuration of an apparatus for reducing image noise according to Embodiment 8 of the present invention. As shown in FIG. 8, the apparatus 800 includes a second image decomposing unit 801, which may be a processor, and a second image processing unit 802, which may be a processor.

The second image decomposing unit 801, which may be a processor, is configured to decompose an original image into at least one color channel image, and the second image processing unit 802 calculates a weighted average value of each pixel of the color channel image by using luminance information, to correct each pixel of the color channel image.

When calculating the weighted average value of each pixel of each color channel image by using luminance information, expression (6) as described in Embodiment 7 is used, its content is herein incorporated, and is not repetitively described in this context.

In this embodiment, obtainment of the various weights, luminance and color values in expression (6) is as described in Embodiment 7.

In this embodiment, the apparatus 800 may further include a luminance weight calculating unit (not shown), which may be a processor, configured to obtain a luminance weight by using expression (3-1) or (3-2), whose content is herein incorporated, and is not repetitively described in this context.

When the luminance weight is calculated by using expression (3-2), parameter a in expression (3-2) may either be preset or auto-adaptively obtained, thus, the apparatus 800 may further include a first parameter obtaining unit (not shown), which may be a processor, as described in Embodiment 6, so no repetition is made in this context.

In this embodiment, the apparatus 800 may further include a distance weight calculating unit (not shown), which may be a processor, obtained by using the aforementioned expression (4-1) or (4-2), whose content is herein incorporated, and is not repetitively described in this context.

In this embodiment, when expression (4-2) is used to calculate the distance weight, the apparatus 800 further includes a second parameter obtaining unit (not shown), which may be a processor, as described in Embodiment 6, so no repetition is made in this context.

In this embodiment, the apparatus 800 may further include a color weight calculating unit (not shown), which may be a processor, configured to obtain a color weight by using the aforementioned expression (5-1) or (5-2), whose content is herein incorporated, and is not repetitively described in this context. When the color weight $W_{C2}(x, y)$ is obtained by using expression (5-2), the value of parameter d in expression (5-2) may be equal to or smaller than 1, but may as well be greater than 1.

In this embodiment, when the color weight is calculated by using expression (5-2), the apparatus 800 may further include a third parameter obtaining unit similar to that described in Embodiment 6, so no repetition is made in this context.

As can be known from the above embodiment, it is possible, by using luminance information to process chrominance or color, to avoid color dispersion at the edge of the image, to effectively reduce image noise, and to be easily implemented.

The following appendices are further disclosed concerning the plurality of embodiments as described above.

A method for reducing image noise, comprising: decomposing an original image into a luminance channel image and at least one chrominance channel image; calculating a weighted average value of each pixel of the luminance channel image and the chrominance channel image by using luminance information, to correct each pixel of the luminance channel image and the chrominance channel image; wherein, the following expression is used when calculating the weighted average value of each pixel of the chrominance channel image by using luminance information:

$$C_{wm\_1}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y) \times C_1(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y)};$$

the following expression is used when calculating the weighted average value of each pixel of the luminance channel image by using luminance information:

$$Y_{wm}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times Y(x, y)}{\sum_{y=y_c-y_{N1}}^{y_c+y_{N2}} \sum_{x=x_c-x_{N1}}^{x_c+x_{N2}} W_d(x, y) \times W_Y(x, y)};$$

where $(x_c, y_c)$ represents a coordinate of a current pixel to be processed; $(x, y)$ represents a coordinate of a pixel to be measured in a predetermined region peripheral to the current pixel; wherein $x_c-x_{N1} \leq x \leq x_c+x_{N2}$; $y_c-y_{N1} \leq y \leq y_c+y_{N2}$; $x_{N1}$, $x_{N2}$, $y_{N1}$, $y_{N2}$ are greater than zero; $C_{wm\_1}(x_c, y_c)$ represents a weighted average value of current pixel chrominance, $W_d(x, y)$ represents a distance weight of the pixel to be measured, $W_Y(x, y)$ represents a luminance weight of the pixel to be measured, $C_1(x, y)$ represents a chrominance value of the pixel to be measured, $W_{C1}(x, y)$ represents a chrominance weight of the pixel to be measured, and $Y(x, y)$ represents a luminance value of the pixel to be measured.

A method for reducing image noise, comprising: calculating a weighted average value of each pixel of at least one color channel image decomposed from an original image by using luminance information, to correct each pixel of the color channel image; wherein, the following expression is used when calculating the weighted average value of each pixel of the color channel image by using luminance information:

$$C_{wm\_2}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y) \times C_2(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y)};$$

where $(x_c, y_c)$ represents a coordinate of a current pixel to be processed; $(x, y)$ represents a coordinate of a pixel to be measured in a predetermined region peripheral to the current pixel; wherein $x_c-x_{N1} \leq x \leq x_c+x_{N2}$; $y_c-y_{N1} \leq y \leq y_c+y_{N2}$; $x_{N1}$, $x_{N2}$, $y_{N1}$, $y_{N2}$ are greater than zero; $C_{wm\_2}(x_c, y_c)$ represents a weighted average value of current pixel color, $W_d(x, y)$ represents a distance weight of the pixel to be measured, $W_Y(x, y)$ represents a luminance weight of the pixel to be measured, $C_2(x, y)$ represents a color value of the pixel to be measured, $W_{C2}(x, y)$ represents a color weight of the pixel to be measured, and $Y(x, y)$ represents a luminance value of the pixel to be measured.

The method according to supplement 1 or 2, wherein, the luminance weight is obtained by using the following expression:

$$W_Y(x, y) = e^{-\frac{D_Y^2}{(sigma\_e1)^2}};$$

or $$W_Y(x, y) = \begin{cases} \left(1 - \frac{D_Y}{th_{e\_Y}}\right)^a & D_Y < th_{e\_Y} \\ 0 & D_Y \geq th_{e\_Y} \end{cases};$$

where Dy represents an absolute value of a luminance difference between the pixel to be measured and the current pixel, sigma_e1 represents filtering strength, $th_{e\_Y}$ represents a first threshold, and a represents a parameter relevant to noise characteristics in a flat region containing the current pixel.

The method according to supplement 3, further comprising: presetting the a; or auto-adaptively obtaining the a, according to steepness degree of a noise curve of noise in the flat region containing the current pixel, wherein a value of a is greater when the noise curve is steep than a value of a when the noise curve is gentle; when a pixel block where the current pixel resides is a bright block, the noise curve is steep; when the pixel block where the current pixel resides is a dark block, the noise curve is gentle.

The method according to supplement 1 or 2, wherein, the distance weight is obtained by using the following expression:

$$W_d(x, y) = e^{-\frac{(x_c-x)^2+(y_c-y)^2}{sigma\_d^2}};$$

or $$W_d(x, y) = \frac{1}{R^b + 1};$$

where R represents a distance of the pixel to be measured to the current pixel in the predetermined region, sigma_d represents filtering strength within a distance space, and b represents a parameter relevant to noise characteristics.

The method according to supplement 5, further comprising: presetting the b; or auto-adaptively obtaining the b according to a range of color noise, wherein a value of b is smaller when the range of the color noise is great than a value of b when the range of the color noise is small.

The method according to supplement 6, wherein b is valuated as 0, 0.4, 0.5 or 1.

The method for reducing image noise according to supplement 1 or 2, wherein, the chrominance weight or the color weight is obtained by the following expression:

$$W_C(x, y) = e^{-\frac{D_C^2}{(sigma\_e2)^2}};$$

or $$W_C(c, y) = \begin{cases} \left(1 - \dfrac{D_C}{th_{e\_C}}\right)^d & D_C < th_{e\_C} \\ 0 & D_C \geq th_{e\_C} \end{cases};$$

where $D_C$ represents an absolute value of a chrominance difference or a color difference between the pixel to be measured and the current pixel; $th_{e\_C}$ represents a second threshold; sigma_e2 represents filtering strength; and d represents a parameter relevant to noise characteristics.

The method according to supplement 8, wherein d is valuated equal to or smaller than 1.

The method according to supplement 9, wherein d is valuated as 0, 0.25 or 0.5.

An apparatus for reducing image noise, comprising: an image decomposing unit configured to decompose an original image into a luminance channel image and at least one chrominance channel image; and a first image processing unit configured to process the luminance channel image and the chrominance channel image by using luminance information, so as to reduce noise of the original image.

An apparatus for reducing image noise, comprising: an image decomposing unit configured to decompose an original image into a luminance channel image and at least one chrominance channel image; and a first image processing unit configured to calculate a weighted average value of each pixel of the luminance channel image and the chrominance channel image by using luminance information, to correct each pixel of the luminance channel image and the chrominance channel image; wherein, the following expression is used when calculating the weighted average value of each pixel of the chrominance channel image by using luminance information:

$$C_{wm\_1}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y) \times C_1(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y)};$$

the following expression is used when calculating the weighted average value of each pixel of the luminance channel image by using luminance information:

$$Y_{wm}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times Y(x, y)}{\sum_{y=y_c-y_{N1}}^{y_c+y_{N2}} \sum_{x=x_c-x_{N1}}^{x_c+x_{N2}} W_d(x, y) \times W_Y(x, y)};$$

where $(x_c, y_c)$ represents a coordinate of a current pixel to be processed; $(x, y)$ represents a coordinate of a pixel to be measured in a predetermined region peripheral to the current pixel; wherein $x_c - x_{N1} \leq x \leq x_c + x_{N2}$; $y_c - y_{N1} \leq y \leq y_c + y_{N2}$; $x_{N1}$, $x_{N2}$, $y_{N1}$, $y_{N2}$ are greater than zero; $C_{wm\_1}(x_c, y_c)$ represents a weighted average value of current pixel chrominance, $W_d(x, y)$ represents a distance weight of the pixel to be measured, $W_Y(x, y)$ represents a luminance weight of the pixel to be measured, $C_1(x, y)$ represents a chrominance value of the pixel to be measured, $W_{C1}(x, y)$ represents a chrominance weight of the pixel to be measured, and $Y(x, y)$ represents a luminance value of the pixel to be measured.

An apparatus for reducing image noise, comprising: a second image processing unit configured to calculate a weighted average value of each pixel of at least one color channel image decomposed from an original image by using luminance information, to correct each pixel of the color channel image; wherein, the following expression is used while calculate the weighted average value of each pixel of the color channel image by using luminance information:

$$C_{wm\_2}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y) \times C_2(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y)};$$

where $(x_c, y_c)$ represents a coordinate of a current pixel to be processed; $(x, y)$ represents a coordinate of a pixel to be measured in a predetermined region peripheral to the current pixel; wherein $x_c - x_{N1} \leq x \leq x_c + x_{N2}$; $y_c - y_{N1} \leq y \leq y_c + y_{N2}$; $x_{N1}$, $x_{N2}$, $y_{N1}$, $y_{N2}$ are greater than zero; $C_{wm\_2}(x_c, y_c)$ represents a weighted average value of current pixel color, $W_d(x, y)$ represents a distance weight of the pixel to be measured, $W_Y(x, y)$ represents a luminance weight of the pixel to be measured, $C_2(x, y)$ represents a color value of the pixel to be measured, $W_{C2}(x, y)$ represents a color weight of the pixel to be measured, and $Y(x, y)$ represents a luminance value of the pixel to be measured.

The apparatus according to supplement 12 or 13, further comprising: a luminance weight calculating unit configured to calculate the luminance weight by using the following expression:

$$W_Y(x, y) = e^{-\frac{D_Y^2}{(sigma\_e1)^2}};$$

or $$W_Y(x, y) = \begin{cases} \left(1 - \dfrac{D_Y}{th_{e\_Y}}\right)^a & D_Y < th_{e\_Y} \\ 0 & D_Y \geq th_{e\_Y} \end{cases};$$

where Dy represents an absolute value of a luminance difference between the pixel to be measured and the current pixel, sigma_e1 represents filtering strength, $th_{e\_Y}$ represents a first threshold, and a represents a parameter relevant to noise characteristics in a flat region containing the current pixel.

The apparatus according to supplement 14, further comprising: a first parameter obtaining unit configured to preset the a, or auto-adaptively obtain the a according to steepness degree of a noise curve, wherein a value of a is greater when the noise curve is steep than a value of a when the noise curve is gentle; when a pixel block where the current pixel resides is a bright block, the noise curve is steep; when the pixel block where the current pixel resides is a dark block, the noise curve is gentle.

The apparatus according to supplement 12 or 13, further comprising: a distance weight calculating unit configured to calculate the distance weight by using the following expression:

$$W_d(x, y) = e^{-\frac{(x_c-x)^2+(y_c-y)^2}{sigma\_d^2}} \text{ ; or}$$

$$W_d(x, y) = \frac{1}{R^b + 1};$$

where R represents a distance of the pixel to be measured to the current pixel in the predetermined region, sigma_d represents filtering strength within a distance space, and b represents a parameter relevant to noise characteristics.

The apparatus according to supplement 16, further comprising: a second parameter obtaining unit configured to preset the b, or auto-adaptively obtain the b according to a range of color noise, wherein a value of b is smaller when the range of the color noise is great than a value of b when the range of the color noise is small.

The apparatus according to supplement 17, wherein b is valuated as 0, 0.4, 0.5 or 1.

The apparatus according to supplement 12 or 13, further comprising: a chrominance/color weight calculating unit configured to calculate the chrominance weight or color weight by using the following expression:

$$W_C(x, y) = e^{-\frac{D_C^2}{(sigma\_e2)^2}};$$

or $$W_C(x, y) = \begin{cases} \left(1 - \frac{D_C}{th_{e\_C}}\right)^d & D_C < th_{e\_C} \\ 0 & D_C \geq th_{e\_C} \end{cases};$$

or wherein $D_C$ represents an absolute value of a chrominance difference between the pixel to be measured and the current pixel; $th_{e\_C}$ represents a second threshold; sigma_e2 represents filtering strength; and d represents a parameter relevant to noise characteristics.

The apparatus according to supplement 19, wherein d is valuated equal to or smaller than 1.

The apparatus according to supplement 20, wherein d is valuated as 0, 0.25 or 0.5.

The aforementioned apparatuses or methods of the present invention may be implemented via hardware, and may also be implemented via hardware in combination with software. The present invention involves such computer-readable program that, when executed by logical components, such as a computer or processor with memory, enables the logical components to realize the aforementioned apparatuses or component parts, or to realize the various aforementioned methods or steps. The present invention further involves such a storage medium storing the aforementioned program as a hard disk, a magnetic disk, an optical disk, a DVD, a flash memory, etc.

The present invention is described above with reference to specific embodiments. However, as should be clear to persons skilled in the art, these descriptions are merely exemplary in nature, rather than restrictions to the protection scope of the present invention. Persons skilled in the art may make various variations and modifications to the present invention according to spirits and principles of the present invention, and all these variations and modifications shall be covered within the protection scope of the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for reducing image noise, comprising:
an image decomposing unit configured to decompose an original image into a luminance channel image and at least one chrominance channel image; and
an image processing unit configured to calculate a weighted average value of each; pixel of the luminance channel image and the chrominance channel image by using luminance information, to correct each pixel of the luminance channel image and the chrominance channel image;
wherein, the following expression is used when calculating the weighted average value of each pixel of the chrominance channel image by using luminance information:

$$C_{wm\_1}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y) \times C_1(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C1}(x, y)};$$

the following expression is used when calculating the weighted average value of each pixel of the luminance channel image by using luminance information:

$$Y_{wm}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times Y(x, y)}{\sum_{y=y_c-y_{N1}}^{y_c+y_{N2}} \sum_{x=x_c-x_{N1}}^{x_c+x_{N2}} W_d(x, y) \times W_Y(x, y)};$$

where ($x_c$, $y_c$) represents a coordinate of a current pixel to be processed; (x, y) represents a coordinate of a pixel to be measured in a predetermined region peripheral to the current pixel;
wherein $x_c-x_{N1} \leq x \leq x_c+x_{N2}$; $y_c-y_{N1} \leq y \leq y_c+y_{N2}$; $x_{N1}$, $x_{N2}$, $y_{N1}$, $y_{N2}$ are greater than zero; $C_{wm\_1}(x_c, y_c)$ represents a weighted average value of current pixel chrominance, $W_d(x, y)$ represents a distance weight of the pixel to be measured, $W_Y(x, y)$ represents a luminance weight of the pixel to be measured, $C_1(x, y)$ represents a chrominance value of the pixel to be measured, $W_{C1}(x, y)$ represents a chrominance weight of the pixel to be measured, and Y(x, y) represents a luminance value of the pixel to be measured.

2. The apparatus according to claim 1, further comprising:
a luminance weight calculating unit configured to calculate the luminance weight by using the following expression:

$$W_Y(x, y) = e^{-\frac{D_Y^2}{(sigma\_e1)^2}}; \text{ or}$$

$$W_Y(x, y) = \begin{cases} \left(1 - \frac{D_Y}{th_{e\_Y}}\right)^a & D_Y < th_{e\_Y} \\ 0 & D_Y \geq th_{e\_Y} \end{cases};$$

where Dy represents an absolute value of a luminance difference between the pixel to be measured and the current pixel, sigma_e1 represents filtering strength, $th_{e\_Y}$ represents a first threshold, and a represents a parameter relevant to noise characteristics in a flat region containing the current pixel.

3. The apparatus according to claim 2, further comprising: a parameter obtaining unit configured to one of preset the a and auto-adaptively obtain the a according to steepness degree of a noise curve, where a value of a is greater when the noise curve is steep than a value of a when the noise curve is gentle, when a pixel block where the current pixel resides is a bright block, the noise curve is steep, when the pixel block where the current pixel resides is a dark block, the noise curve is gentle.

4. The apparatus according to claim 1, further comprising: a distance weight calculating unit configured to calculate the distance weight by using the following expression:

$$W_d(x, y) = e^{-\frac{(x_c-x)^2+(y_c-y)^2}{sigma\_d^2}}; \text{ or}$$

$$W_d(x, y) = \frac{1}{R^b + 1};$$

where R represents a distance of the pixel to be measured to the current pixel in the predetermined region, sigma_d represents filtering strength within a distance space, and b represents a parameter relevant to noise characteristics.

5. The apparatus according to claim 4, further comprising: a parameter obtaining unit configured to one of preset the b and auto-adaptively obtain the b according to a range of color noise, wherein a value of b is smaller when the range of the color noise is great than a value of b when the range of the color noise is small.

6. The apparatus according to claim 1, further comprising: a chrominance/color weight calculating unit configured to calculate the chrominance weight or color weight by using the following expression:

$$W_C(x, y) = e^{-\frac{D_C^2}{(sigma\_e2)^2}};$$

or $$W_C(x, y) = \begin{cases} \left(1 - \frac{D_C}{th_{e\_C}}\right)^d & D_C < th_{e\_C} \\ 0 & D_C \geq th_{e\_C} \end{cases};$$

wherein $D_C$ represents an absolute value of a chrominance difference between the pixel to be measured and the current pixel; $th_{e\_C}$ represents a second threshold; sigma_e2 represents filtering strength; and d represents a parameter relevant to noise characteristics.

7. The apparatus according to claim 6, wherein d is valuated to one of equal to and smaller than 1.

8. The apparatus according to claim 7, wherein d is valuated as one of 0, 0.25, and 0.5.

9. An apparatus for reducing image noise, comprising: an image processing unit comprising a processor configured to calculate a weighted average value of: each pixel of at least one color channel image decomposed from an original image by using luminance information, to correct each pixel of the color channel image;

wherein, the following expression is used while calculating the weighted average value of each pixel of the color channel image by using luminance information:

$$C_{wm\_2}(x_c, y_c) = \frac{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y) \times C_2(x, y)}{\sum_{y=y_c-y_{N1}}^{y_c+y_{N2}} \sum_{x=x_c-x_{N1}}^{x_c+x_{N2}} W_d(x, y) \times W_Y(x, y) \times W_{C2}(x, y)};$$

where $(x_c, y_c)$ represents a coordinate of a current pixel to be processed; (x, y) represents a coordinate of a pixel to be measured in a predetermined region peripheral to the current pixel;

wherein $x_c-x_{N1} \leq x \leq x_c+x_{N2}$; $y_c-y_{N1} \leq y \leq y_c+y_{N2}$; $x_{N1}$, $x_{N2}$, $y_{N1}$, $y_{N2}$ are greater than zero; $C_{wm\_2}(x_c, y_c)$ represents a weighted average value of current pixel color, $W_d(x, y)$ represents a distance weight of the pixel to be measured, $W_Y(x, y)$ represents a luminance weight of the pixel to be measured, $C_2(x, y)$ represents a color value of the pixel to be measured, $W_{C2}(x, y)$ represents a color weight of the pixel to be measured, and Y(x, y) represents a luminance value of the pixel to be measured.

10. The apparatus according to claim 9, further comprising: a luminance weight calculating unit configured to calculate the luminance weight by using the following expression:

$$W_Y(x, y) = e^{-\frac{D_Y^2}{(sigma\_e1)^2}}; \text{ or}$$

$$W_Y(x, y) = \begin{cases} \left(1 - \frac{D_Y}{th_{e\_Y}}\right)^a & D_Y < th_{e\_Y} \\ 0 & D_Y \geq th_{e\_Y} \end{cases};$$

where Dy represents an absolute value of a luminance difference between the pixel to be measured and the current pixel, sigma_e1 represents filtering strength, $th_{e\_Y}$ represents a first threshold, and a represents a parameter relevant to noise characteristics in a flat region containing the current pixel.

11. The apparatus according to claim 10, further comprising: a parameter obtaining unit configured to one of preset the a and auto-adaptively obtain the a according to steepness degree of a noise curve, wherein a value of a is greater when the noise curve is steep than a value of a when the noise curve is gentle, when a pixel block where the current pixel resides is a bright block, the noise curve is steep, when the pixel block where the current pixel resides is a dark block, the noise curve is gentle.

12. The apparatus according to claim 9, further comprising: a distance weight calculating unit configured to calculate the distance weight by using the following expression:

$$W_d(x, y) = e^{-\frac{(x_c-x)^2+(y_c-y)^2}{sigma\_d^2}}; \text{ or}$$

$$W_d(x, y) = \frac{1}{R^b + 1};$$

where R represents a distance of the pixel to be measured to the current pixel in the predetermined region, sigma_d represents filtering strength within a distance space, and b represents a parameter relevant to noise characteristics.

13. The apparatus according to claim 12, further comprising: a parameter obtaining unit configured to one of preset the b and auto-adaptively obtain the b according to a range of color noise, wherein a value of b is smaller when the range of the color noise is great than a value of b when the range of the color noise is small.

14. The apparatus according to claim 9, further comprising:
a chrominance/color weight calculating unit configured to calculate the chrominance weight or color weight by using the following expression:

$$W_C(x, y) = e^{-\frac{D_C^2}{(sigma\_e2)^2}};$$

or $$W_C(x, y) = \begin{cases} \left(1 - \frac{D_C}{th_{e\_C}}\right)^d & D_C < th_{e\_C} \\ 0 & D_C \geq th_{e\_C} \end{cases};$$

wherein $D_C$ represents an absolute value of a chrominance difference between the pixel to be measured and the current pixel; $th_{e\_C}$ represents a second threshold; sigma_e2 represents filtering strength; and d represents a parameter relevant to noise characteristics.

15. The apparatus according to claim 14, wherein d is valuated to one of equal to and smaller than 1.

16. The apparatus according to claim 7, wherein d is valuated as one of 0, 0.25, and 0.5.

* * * * *